Patented Dec. 19, 1950

2,534,284

UNITED STATES PATENT OFFICE 2,534,284

COAGULANT AND METHOD OF CLARIFYING TURBID WATER THEREWITH

Rawland R. Magill, Chicago, Ill.

No Drawing. Application August 13, 1947,
Serial No. 768,494

6 Claims. (Cl. 210—23)

The present invention relates to the treatment of water and more particularly to a new coagulant composition and process for the treatment of turbid water in a municipal water treating plant, to clarify and soften it.

Various processes for clarifying and softening turbid water by use of coagulants have been practiced for many years, but for the most part, such processes have been inefficient, time consuming, and expensive to carry out. In many cases the mediocre success of these processes has resulted from the use of coagulants in the form of compounds containing aluminum and iron. Such compounds are unsuitable because they do not dissolve readily and, therefore, coagulation is slow, particularly at a relatively low temperature, such as 60° F. and lower. Processes employing such compounds require long treatment periods and, even then, do not completely clarify the water. In other cases, the coagulants employed have been objectionable because of their cost.

The foregoing disadvantages of the prior art coagulants and water clarifying processes are completely overcome in accordance with the present invention wherein I utilize a novel coagulant that, on contact with water, reacts immediately to form a floc. This floc operates rapidly to absorb the suspended and dissolved impurities in the turbid water, and then precipitates, thus leaving the water clear and soft. The coagulant of my invention is characterized by its rapid solubility and floc-forming tendency in water. It clarifies turbid water of any temperature, even cold water of a temperature of 40° to 45° F. and lower, and has no detrimental or deleterious effect upon the water treated therewith. The coagulant of my invention is less expensive than those heretofore used and has other advantages which will be manifest from the following detailed description of the invention.

The process of my invention comprises, in general, the treatment of turbid water in the presence of slaked lime, with a homogeneous, readily soluble, reaction product formed by mixing limestone, sequentially, with an alkali metal hydroxide and an alkali metal carbonate.

The coagulant reaction product of the present invention is formed by mixing finely divided limestone in either a powdered or pulverized state of about 20 mesh and finer, with an alkali metal hydroxide, particularly sodium hydroxide, in flake, granular or other divided form. The mixing is effected in a dough, concrete or other mixer adapted to mix solids with water, in the presence of water to bring about a reaction between the limestone and sodium hydroxide. The amount of moisture necessary to aid in effecting this reaction may vary within fairly wide limits, from about 2% to 15% by weight, based on the weight of the limestone. This water can be added water or water normally present as moisture on the limestone and/or the other reactants. The mixing is continued until the mass is homogeneous and then an alkali metal carbonate, particularly soda ash, is added. Mixing of the mass is continued until the limestone, caustic soda and soda ash have reacted. At room temperature, this reaction is completed in about 5 to 10 minutes after the addition of the soda ash.

The final product is usually, and preferably, substantially dry to the touch; however, the condition of the product in this respect is dependent upon the amount of water used in the reaction. If this water content substantially exceeds 15% by weight of the limestone, the product generally is moist and unstable. If the limestone contains an inordinately large amount of moisture beyond 15%, the excess moisture can be removed by roasting or by the addition of high calcium quick lime.

It is preferred that all of the reactants be finely divided to 20 mesh or finer since a more intimate mixture and complete reaction between the reactants may thus be more quickly obtained.

The preferred coagulant in accordance with the present invention is formed by reacting 70% by weight of limestone, 20% by weight of sodium hydroxide and 10% by weight of sodium carbonate, all in a finely divided state, in the presence of approximately 2% to 10% by weight of moisture, based on the weight of the limestone. The proportions of the reactants may vary rather widely; however, for the best results the proportions should not vary to any substantial extent from the preferred proportions. It is preferred that the amount of limestone used be about 50 to 80% by weight of the whole. The sodium hydroxide and sodium carbonate make up the difference, but the amount of the former should be in excess of the latter, preferably in the approximate proportions of two parts by weight of the hydroxide to one of the carbonate.

In carrying out the process of this invention, slaked lime may be added to the water to be treated with my coagulant, either before or during treatment. The use of slaked lime is preferred since it has been found that the amount of coagulant required per gallon of water to be treated is considerably less when slaked lime is present. The concentration of slaked lime ordinarily employed is about three grains per gallon of water to be treated. With this concentration of lime, the amount of coagulant of the present invention required to obtain the optimum reaction may range from about one-quarter grain to one grain of coagulant per gallon of water. The quantities of slaked lime and coagulant compound employed may, obviously, be varied to meet any desired need and the lower limits of the quantities of these materials which may be used are dependent, at least to some extent, upon the natural lime content of the water treated as shown by analysis. The amounts employed should be balanced with respect to the water treated to insure that clear, softened water is obtained by the treatment. This may be readily determined by laboratory procedure.

Throughout the treating period the water and coagulant are agitated by stirring in order to build up the particle size of the floc and cause precipitation. A decided floc is visible within about three minutes after the addition of the coagulant to the water, and a maximum floc is usually obtained at the end of about seven minutes. Agitation may be continued until the treatment has extended over a period of from twenty to thirty minutes, after which agitation is discontinued and the precipitated floc containing the impurities from the water is permitted to settle to the bottom of the treating tank. The resulting clear water may then be withdrawn and the precipitate discarded, or the latter may be removed continuously from the bottom of the tank, as desired.

In agitating the water, care must be exercised to avoid disrupting or destroying the particles of the floc.

The formation of the floc passes through three distinct phases. In the first phase, mono-molecular precipitates are formed as a result of chemical reaction which takes place practically instantaneously upon the addition of the coagulant to the water treated. In the second phase, the dispersed particles resulting from initial reaction are kept in motion which serves to bring the dispersed particles into contact with one another, whereupon they coalesce and form progressively larger particles. This continues until the particles reach the upper limit of size of colloidal particles, whereupon diffusion becomes negligible. The particles at this point are barely discernible under a binocular microscope and are about one micron in diameter. The third phase is the continued increase of particle size by mechanical means. Through the medium of stirring the particles increase in size until they are large enough to precipitate and settle.

The foregoing observations were made by means of light beams, in the water treated, to determine the time of appearance of floc in test containers. When the coagulant of the invention was added to raw water in small increments, a faint Tyndall cone appeared instantly, and upon adding quick lime, a definite cloudiness appeared in the beam within two seconds. It is further observed that with the coagulant of the present invention, changes in temperature of the water had no appreciable effect upon the formation of floc or the pH of the reaction. These latter factors are of particular importance in actual practice of the invention where coagulant basins are subjected to variations in temperatures as a result of varying weather conditions and where control laboratories in water plants are heated. In this connection, and in order that the raw water may be neither too acid nor too alkaline, the pH of the water should be between 7.5 and 11.8, preferably between 8.0 and 10.8. The pH of the raw water to be treated may be controlled and regulated by variation in the amount of quick lime added thereto, as aforesaid.

On the basis of tests, I have found that about one part by weight of the coagulant of my invention is capable of more effectively clarifying turbid water than are from about three to six parts by weight of alum, depending on the grade or quality of the alum.

I claim:

1. A coagulant for the treatment of turbid water to clarify the same comprising the water-soluble, substantially dry to the touch product formed by intimately mixing, successively, in the presence of water, limestone, an alkali metal hydroxide and an alkali metal carbonate, the solid ingredients being in finely divided form and being mixed in proportions of about 50 to 80% by weight of limestone with the other solid ingredients constituting the remainder and in proportions to provide an excess of said hydroxide by weight with respect to the carbonate and the water being approximately 2 to 10% by weight of the amount of limestone.

2. A coagulant for the treatment of turbid water to clarify the same comprising the water-soluble, substantially dry to the touch product formed by intimately mixing, successively, in the presence of water, limestone, sodium hydroxide and sodium carbonate, the said solid ingredients being in finely divided form and being mixed in proportions of about 50 to 80% by weight of said limestone with the other solid ingredients constituting the remainder and in proportions to provide an excess of said hydroxide by weight with respect to the carbonate and the water being approximately 2 to 10% by weight based on the amount of limestone.

3. A coagulant for the treatment of turbid water to clarify the same comprising the water-soluble, substantially dry to the touch product formed by intimately mixing, successively, in the presence of water, limestone, sodium hydroxide and sodium carbonate, the said solid ingredients being in finely divided form and being mixed in proportions of about 50 to 80% by weight of limestone with the other ingredients constituting the remainder and in proportions to provide about 2 parts by weight of said hydroxide to 1 part by weight of said carbonate and the water being approximately 2 to 10% by weight of the amount of limestone.

4. A coagulant for the treatment of turbid water to clarify the same comprising the water-soluble, substantially dry to the touch product formed by intimately mixing approximately 70% by weight of limestone, 20% by weight of sodium hydroxide and 10% by weight of sodium carbonate, all in a finely divided state, in the presence of 2 to 10% by weight of water based on the amount of limestone used.

5. The method of clarifying turbid water which comprises admixing with the water slaked lime, and in addition a water-soluble substantially dry to the touch coagulant formed by intimately mixing, successively, in the presence of an extremely small amount of water, limestone sodium hydroxide and sodium carbonate, the said solid ingredients being in finely divided form and being mixed in proportions of about 50 to 80% by weight of said limestone with the other solid ingredients constituting the remainder and in proportions to provide an excess of said hydroxide by weight with respect to the carbonate, and gently agitating the water while the coagulant is present therein until a floc of a size capable of precipitation is formed.

6. The method of clarifying turbid water which comprises admixing with the water slaked lime, and in addition a water-soluble substantially dry to the touch coagulant formed by reacting approximately 70% by weight of limestone, 20% by weight of sodium hydroxide and 10% by weight of sodium carbonate, all in a finely divided state, in the presence of 2 to 10% by weight of water based on the amount of limestone used, and gently agitating the water while the coagulant is present therein until a floc of a size capable of precipitation is formed.

RAWLAND R. MAGILL.

REFERENCES CITED

The following references are of record in the file of this patent:

UNITED STATES PATENTS

| Number | Name | Date |
|---|---|---|
| 1,315,836 | Hoffman | Sept. 9, 1919 |
| 1,500,993 | Jones | July 8, 1924 |
| 1,604,126 | Kern | Oct. 26, 1926 |
| 1,620,333 | Evans | Mar. 8, 1927 |
| 1,653,272 | Green | Dec. 20, 1927 |

FOREIGN PATENTS

| Number | Country | Date |
|---|---|---|
| 227,429 | Great Britain | Jan. 28, 1926 |